(12) United States Patent
Hunter et al.

(10) Patent No.: US 9,473,009 B2
(45) Date of Patent: Oct. 18, 2016

(54) PERMANENT MAGNET LINEAR ACTUATORS

(71) Applicant: Nucleus Scientific, Inc., Cambridge, MA (US)

(72) Inventors: Ian W. Hunter, Lincoln, MA (US); Timothy A. Fofonoff, Cambridge, MA (US); George C. Whitfield, Winchester, MA (US)

(73) Assignee: NUCLEUS SCIENTIFIC, INC., Cambridge, MA (US)

(*) Notice: Subject to any disclaimer, the term of this patent is extended or adjusted under 35 U.S.C. 154(b) by 0 days.

(21) Appl. No.: 14/253,960

(22) Filed: Apr. 16, 2014

(65) Prior Publication Data

US 2014/0312716 A1 Oct. 23, 2014

Related U.S. Application Data

(60) Provisional application No. 61/813,461, filed on Apr. 18, 2013.

(51) Int. Cl.
*H02K 41/02* (2006.01)
*H02K 41/03* (2006.01)
(Continued)

(52) U.S. Cl.
CPC ............ *H02K 41/02* (2013.01); *H02K 41/031* (2013.01); *H02K 41/033* (2013.01); *H02K 41/0356* (2013.01); *H02K 41/06* (2013.01);
(Continued)

(58) Field of Classification Search
CPC .. H02K 33/16; H02K 33/18; H02K 2201/18; H02K 41/0356; H02K 41/02; H02K 41/031; H02K 7/09; H02K 33/00; H02K 41/06; H02K 11/33; H02K 3/50; H02K 9/19; G03F 7/70758; G03F 7/70725; G03F 7/70825; G03F 7/70775
USPC .......... 310/12, 328, 90.5, 14, 36, 15, 30, 23, 310/156, 12.01, 12.02, 12.03, 12.05, 12.06, 310/12.07, 12.08, 12.09, 12.11, 12.12, 310/12.14, 12.15, 12.16, 12.17, 12.18, 310/12.19, 12.21, 12.22, 12.23, 12.24, 310/12.25, 12.26, 12.27, 12.28, 12.29, 310/12.31, 12.32, 12.33, 68 R
See application file for complete search history.

(56) References Cited

U.S. PATENT DOCUMENTS 2,991,377 A * 7/1961 Vose et al. .................... 310/61
4,179,630 A * 12/1979 Stuber ............................ 310/15
(Continued)

FOREIGN PATENT DOCUMENTS

JP 2009038869 2/2009

*Primary Examiner* — Terrance Kenerly
*Assistant Examiner* — Alexander Singh
(74) *Attorney, Agent, or Firm* — Occhiuti & Rohlicek LLP

(57) ABSTRACT

An electromagnetic actuator including: a core comprising a material having a high magnetic permeability relative to air; an array of coils sequentially arranged on the core, each coil of the array of coils being wound around the longitudinal axis of the core; and a magnet assembly movably mounted along the array of coils, the magnet assembly having a coil side facing the array of coils and an opposite side facing away from the array of coils and including an array of permanent magnets sequentially arranged along the array of coils in a direction parallel to the longitudinal axis, wherein the magnetic moments of the plurality of magnets are selected and arranged to augment the magnetic field produced on the coil side of the magnet assembly and to reduce the magnetic field produced on the opposite side of the magnet assembly.

20 Claims, 13 Drawing Sheets

(51) Int. Cl.
    *H02K 41/06*     (2006.01)
    *H02K 41/035*     (2006.01)
    *H02K 3/50*     (2006.01)
    *H02K 9/19*     (2006.01)

(52) U.S. Cl.
    CPC ............... *H02K 3/50* (2013.01); *H02K 9/19* (2013.01); *H02K 11/33* (2016.01)

(56) References Cited

U.S. PATENT DOCUMENTS

| | | | |
|---|---|---|---|
| 4,675,563 A * | 6/1987 | Goldowsky | 310/15 |
| 4,796,511 A * | 1/1989 | Eyssa | 89/8 |
| 5,440,183 A * | 8/1995 | Denne | 310/12.26 |
| 5,535,853 A * | 7/1996 | Skalski | 187/410 |
| 5,723,917 A | 3/1998 | Chitayat | |
| 6,114,781 A * | 9/2000 | Hazelton et al. | 310/12.29 |
| 6,836,036 B2 * | 12/2004 | Dube | H02K 1/148 180/65.51 |
| 7,586,217 B1 * | 9/2009 | Smith et al. | 310/12.25 |
| 7,965,010 B2 * | 6/2011 | Froeschle et al. | 310/156.43 |
| 2003/0102723 A1 * | 6/2003 | Korenaga | 310/12 |
| 2004/0245861 A1 * | 12/2004 | Miyajima et al. | 310/12 |
| 2005/0200828 A1 * | 9/2005 | Tanaka | G03F 7/70858 355/72 |
| 2006/0108878 A1 * | 5/2006 | Lindberg | H02K 1/02 310/12.22 |
| 2006/0208600 A1 * | 9/2006 | Sahyoun | H02K 33/16 310/254.1 |
| 2009/0308571 A1 * | 12/2009 | Thompson et al. | 165/79 |
| 2010/0176668 A1 * | 7/2010 | Murakami | H02K 3/24 310/54 |
| 2011/0193425 A1 | 8/2011 | Hiura et al. | |
| 2011/0316358 A1 * | 12/2011 | Sugita | H02K 3/24 310/12.29 |

\* cited by examiner

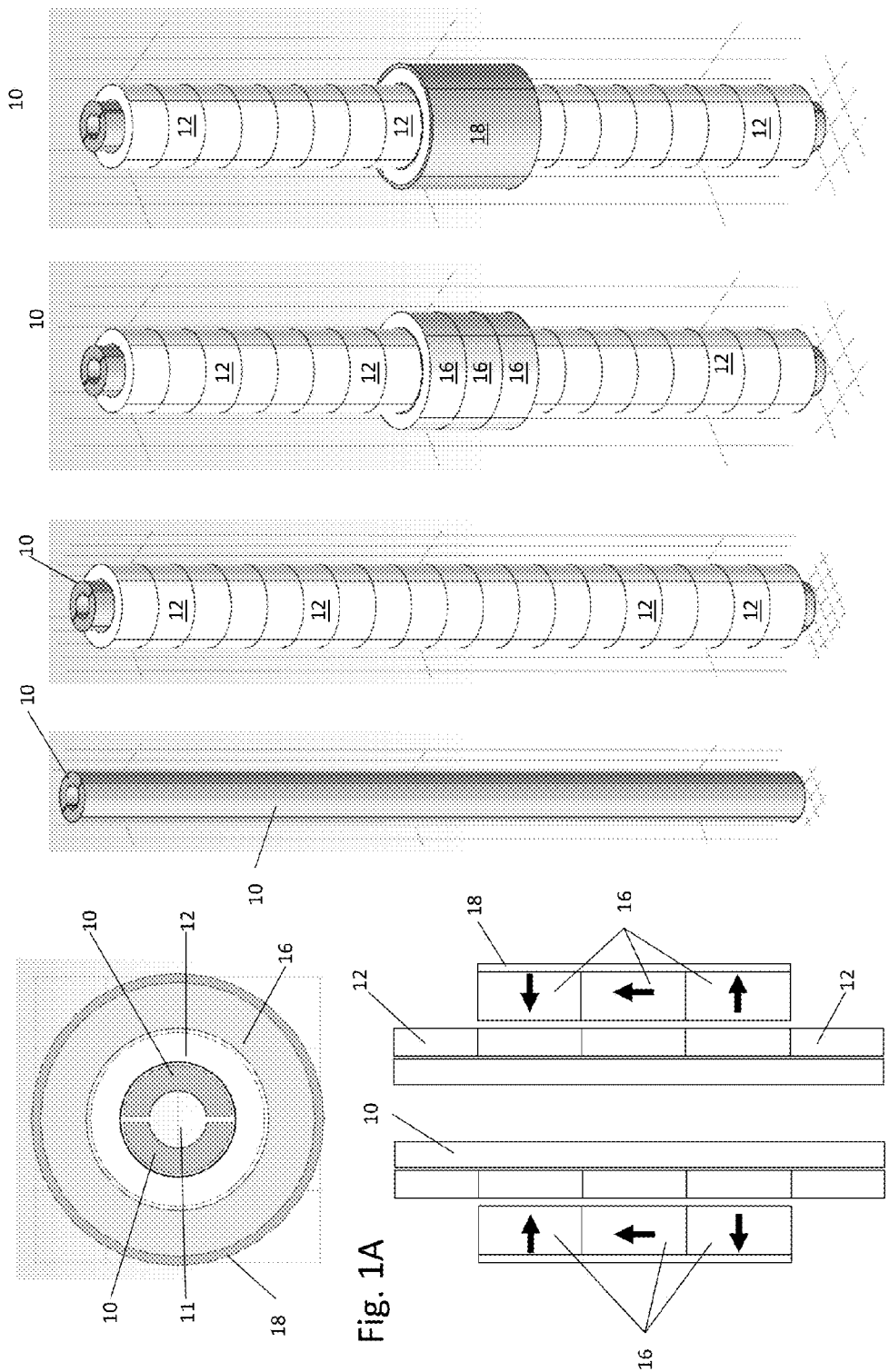

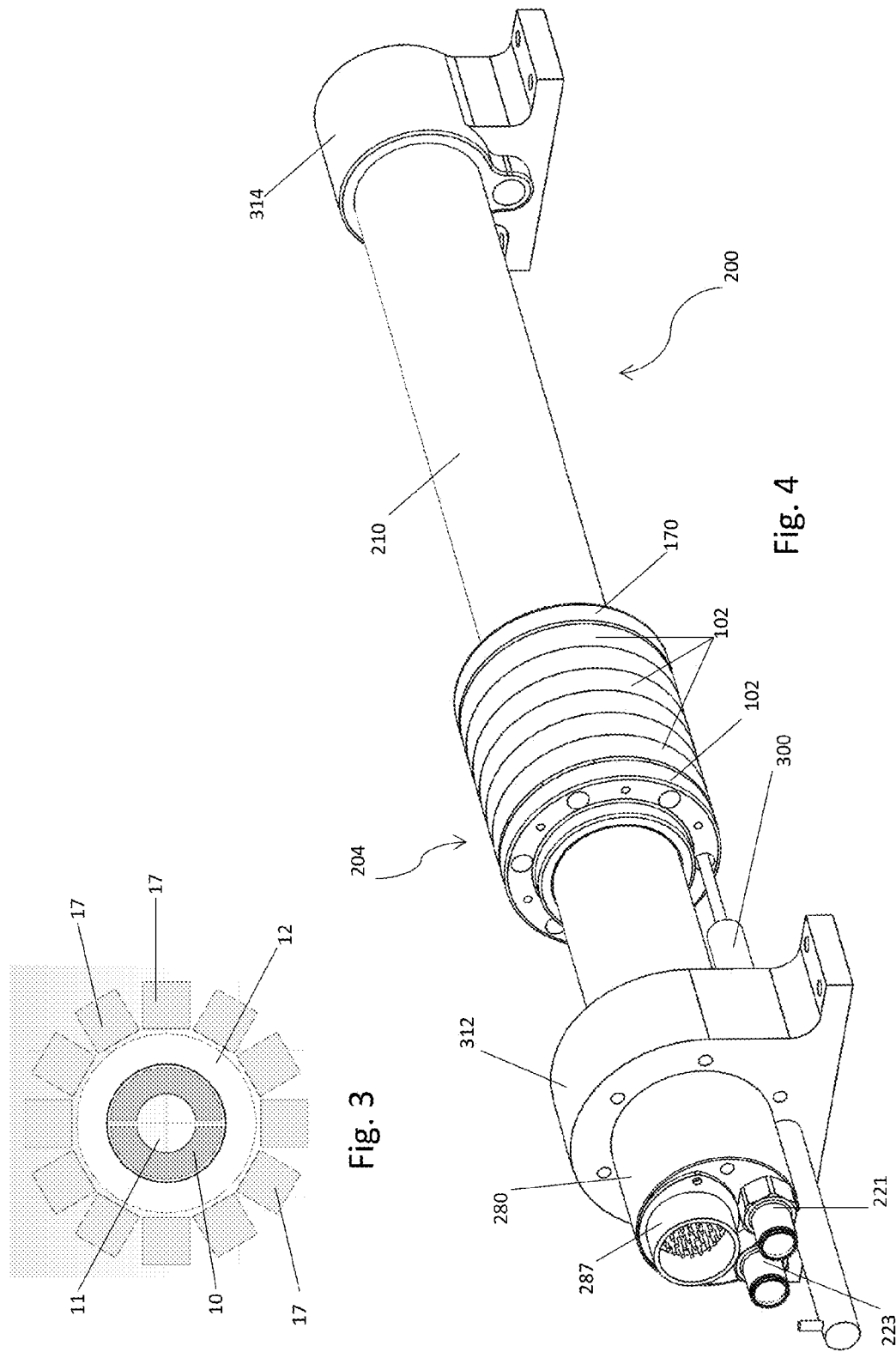

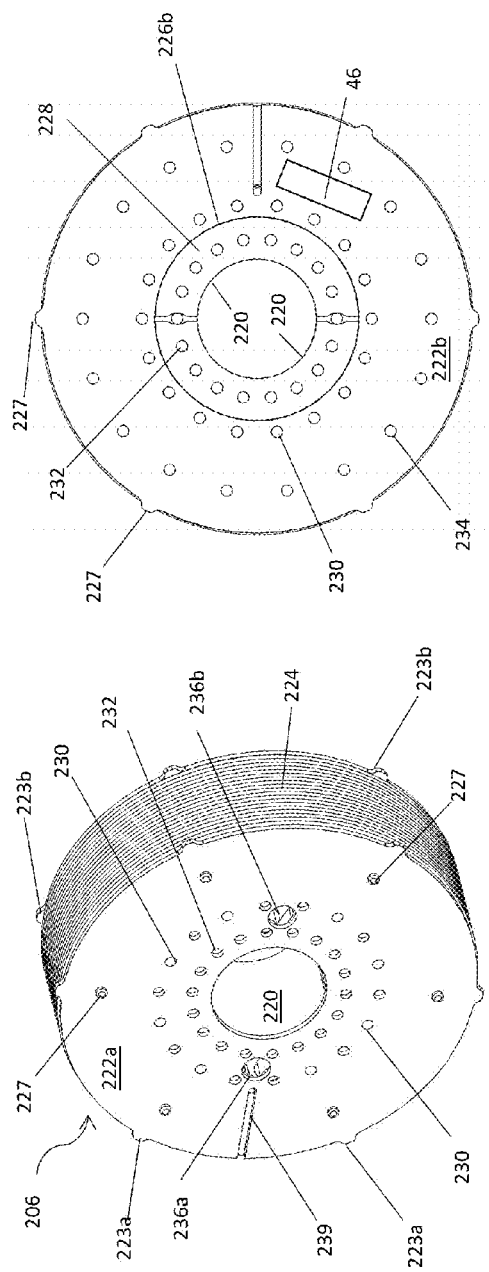
Fig. 6A
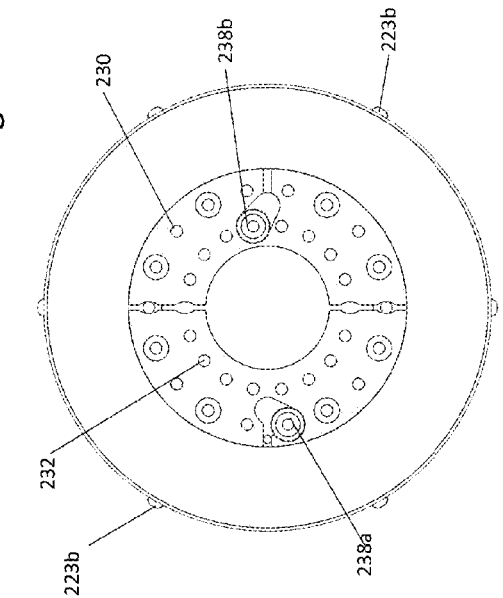
Fig. 6B
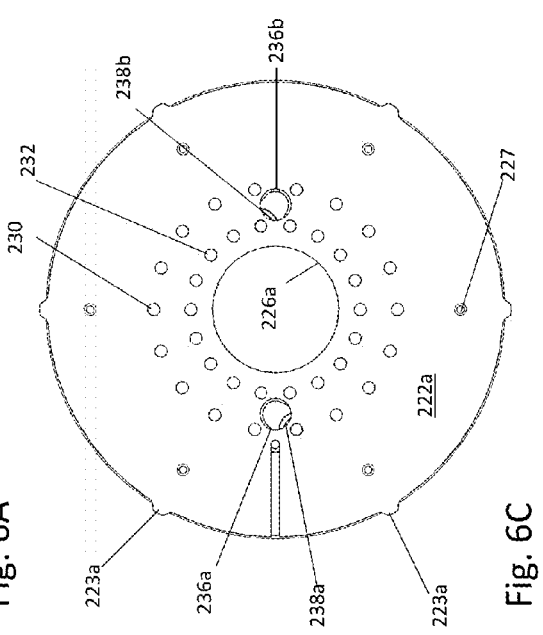
Fig. 6C
Fig. 6D

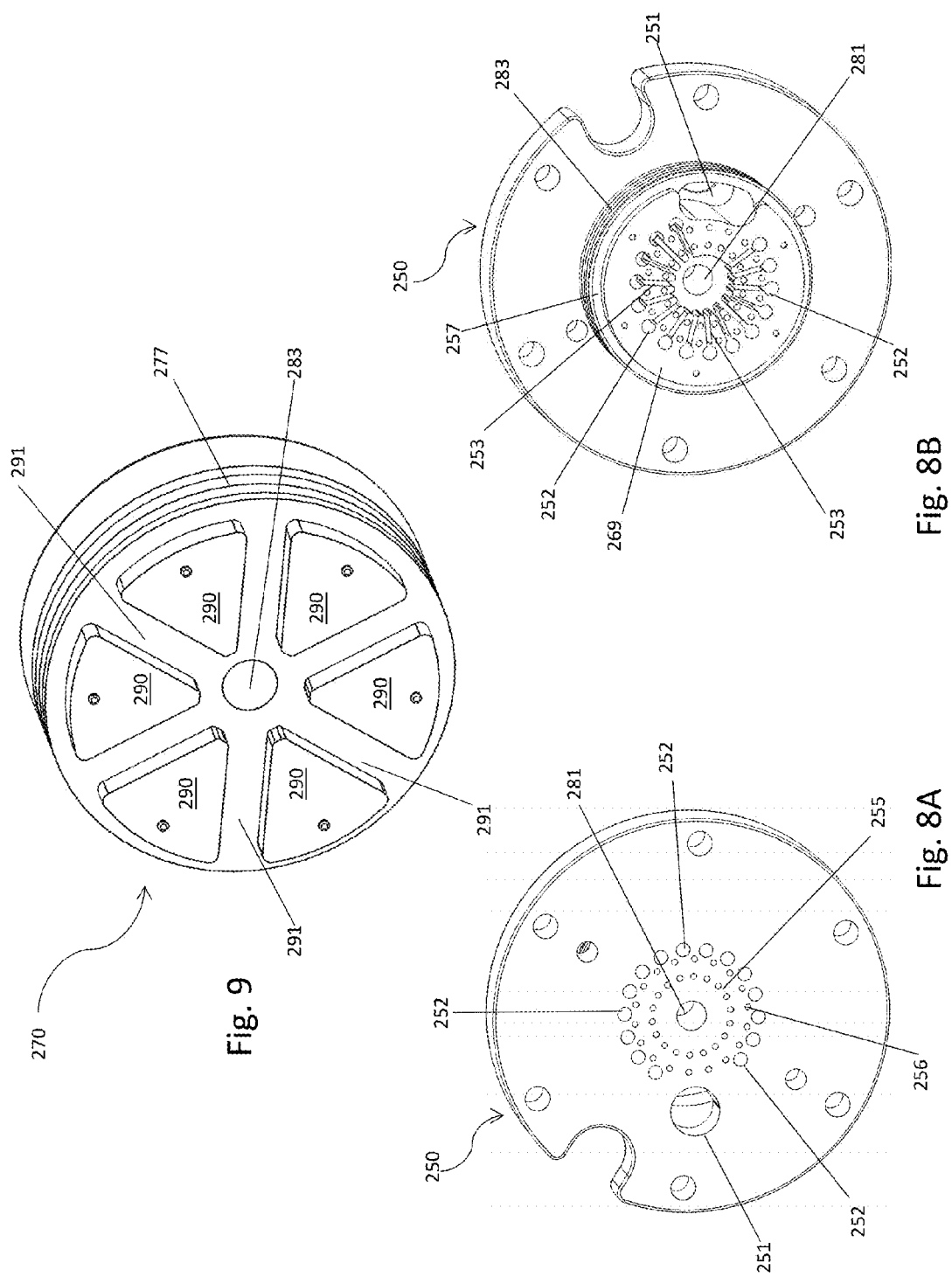

PERMANENT MAGNET LINEAR ACTUATORS

This application claims the benefit under 35 U.S.C. §119 (e) of Provisional Application Ser. No. 61/813,461 filed Apr. 18, 2013, entitled "Linear Actuators for Use in Robotic Devices", the entire contents of which are incorporated herein by references.

TECHNICAL FIELD

The invention relates generally to linear actuators, and more specifically to permanent magnet linear tubular actuators.

BACKGROUND

Electromagnetic linear motors, sometimes also referred to as linear actuators, are typically devices that convert electric energy into linear motion. There are at least two general types of linear motor. One type generates the linear motion by first generating rotary motion and then converting the rotary motion to linear motion. Another type generates the linear motion directly, without first generating rotary motion. Functionally, this second type of linear motor is similar to a rotary motor. They both have magnetic field components. In the case of the rotary motor, the magnetic field components, which typically include a rotor and a stator, are laid out in a circular arrangement. In the case of the linear motor, the magnetic field components, which functionally correspond to the rotor and stator circular magnetic field components, are laid out in a straight line. So, for example, where a rotary motor would spin around and re-use the same magnetic pole faces, the magnetic field components of a linear motor might be physically repeated over the length of the actuator. In addition, the structures of linear machines can often be simpler than the structures of rotary motors.

SUMMARY

In general, in one aspect, the invention features an electromagnetic actuator including: a core having a longitudinal axis and made of a material having a high magnetic permeability relative to air; an array of coils sequentially arranged on the core, each coil of the array of coils being wound around the longitudinal axis of the core; and a magnet assembly movably mounted along the array of coils, the magnet assembly having a coil side facing the array of coils and an opposite side facing away from the array of coils, the magnet assembly including an array of permanent magnets sequentially arranged along the array of coils in a direction parallel to the longitudinal axis, each permanent magnet characterized by a magnetic field of a particular direction and wherein the magnetic fields of the plurality of magnets are selected and arranged to augment the magnetic field produced on the coil side of the magnet assembly and to reduce the magnetic field produced on the opposite side of the magnet assembly.

Some embodiments include one or more of the following features. The array of coils is a linear array of coils. The array of permanent magnets forms only one magnetic circuit or multiple magnetic circuits, in which neighboring magnetic circuits are a mirror of each other. The magnet assembly includes a plurality of arrays of permanent magnets arranged about the array of coils to form a plurality of magnetic rings, each of which surrounds the array of coils. Alternatively, the array of permanent magnets is an array of permanent ring magnets, each one encircling the coil array. The core is a segmented along the longitudinal axis. The coils in the array of coils are all individually controllable. The electromagnetic actuator also includes a sleeve surrounding the array of coils, wherein the magnet assembly rides on the sleeve. The sleeve is cylindrically shaped. The sleeve has an inside wall that is spaced apart from the coil array to form a coolant flow channel surrounding and extending the length of the coil array. The channel surrounding and extending the length of the coil array is a generally annular shaped channel. The coils in the array of coils all have a width D along the longitudinal axis and the magnets in the linear array of permanent magnets also all have widths equal to D along the longitudinal axis. Alternatively, the magnets in the linear array of permanent magnets all have widths equal to 1.5 D along the longitudinal axis. The core is made of iron and/or steel. The coils in the array of coils are cylindrically shaped. The core is cylindrically shaped with a hollow region inside the core extending from at least one end of the array of coils to at least the other end of the array of coils. The array of magnets includes three magnets in sequence with the directions of the magnetic fields of three magnets being selected and arranged to yield +T, +L, −T, wherein +T indicates a magnetic field that is oriented transverse to the longitudinal axis, wherein −T indicates a magnetic field that is oriented transverse to the longitudinal axis and in a direction that is opposite to +T, and wherein +L indicates a magnetic field that is oriented parallel to the longitudinal axis. Alternatively, the array of magnets includes six magnets in sequence with the directions of the magnetic fields of three magnets being selected and arranged to yield +T, +L, −T, −T, −L, +T, wherein +T indicates a magnetic field is oriented transverse to the longitudinal axis, wherein −T indicates a magnetic field that is oriented transverse to the longitudinal axis and in a direction that is opposite to +T, wherein +L indicates a magnetic field that is oriented parallel to the longitudinal axis, and wherein −L indicates a magnetic field that is oriented parallel to the longitudinal axis and in a direction that is opposite to +L.

Other embodiments include one or more of the following features. The core defines a hollow inner region extending the length of the core and through which a liquid coolant is pumped during operation. The electromagnetic actuator further includes a manifold at one end of the sleeve, the manifold having a coolant inlet port and providing a path for transferring coolant arriving through the inlet port into the coil assembly. The manifold also has a coolant outlet port and provides another path for transferring coolant from the coil assembly out of the outlet port after the coolant has circulated through the coil assembly. The electromagnetic actuator also includes a flow distribution plate between the manifold and the sleeve, the flow distribution plate defining one or more channels for transferring coolant from the manifold to the annular flow channel surrounding the coil array. The electromagnetic actuator further includes a flow redirection plate at other end of the sleeve from the manifold, the flow redirection plate defining one or more channels for transferring coolant between the core region and the annular flow channel. The core includes one or more passages for holding wires that electrically connect to the coils in the array of coils. The core includes two segments each of which extends down the length of the array of coils, the two segments serving as conducting lines for delivering power to the coils in the array of coils.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIGS. 1A-F show the various parts of a linear tubular actuator with a single magnetic circuit and an outer soft magnetic sheath.

FIG. 3 shows another way of constructing the ring magnets used in the linear tubular actuators.

FIG. 4 shows a perspective view of another embodiment of a linear tubular actuator.

FIGS. 6A-D show details of the coils for the linear tubular actuator of FIG. 4. FIG. 6A is a perspective view of the coil. FIGS. 6B-C are views of the coil from each side. And FIG. 6D is a view of the coil with the sidewall 222a removed.

FIGS. 8A-B show perspective views from the front and the back of the flow distribution plate for the linear tubular actuator of FIG. 4.

FIG. 9 shows a perspective view of the flow redirection plate for the linear tubular actuator of FIG. 4.

Note that like components and features in the drawings are identified by the same numbers.

DETAILED DESCRIPTION

Figure 2E:
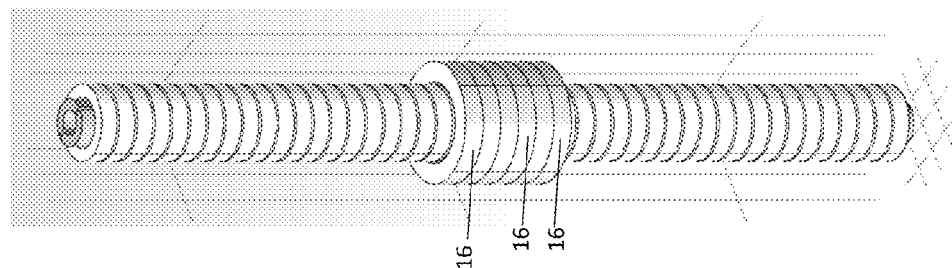
FIGS. 2A-E show various parts of a linear tubular actuator with a double magnetic circuit.
Figure 2D:
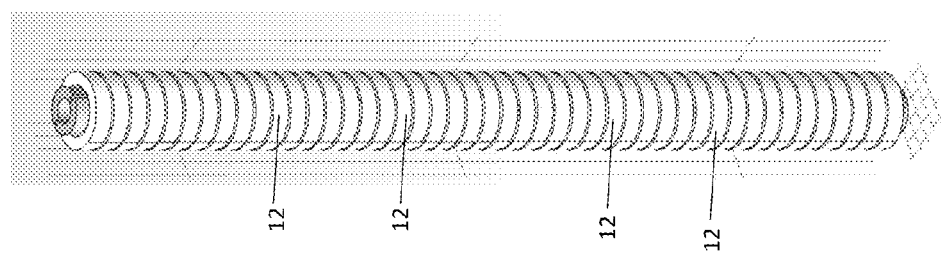
Figure 2C:
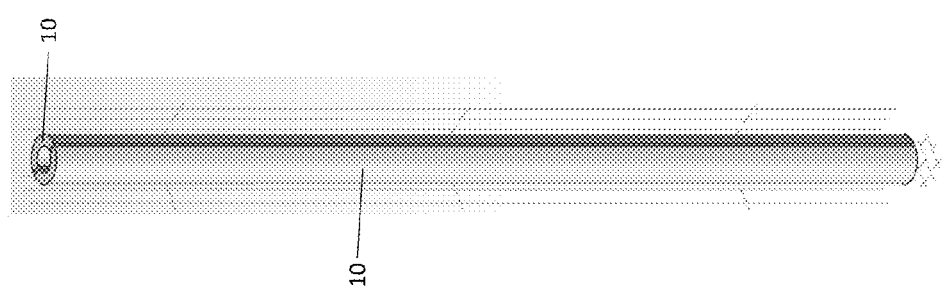
Figure 2A:
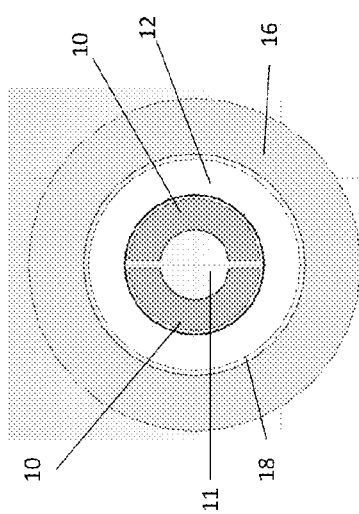
Figure 2B:
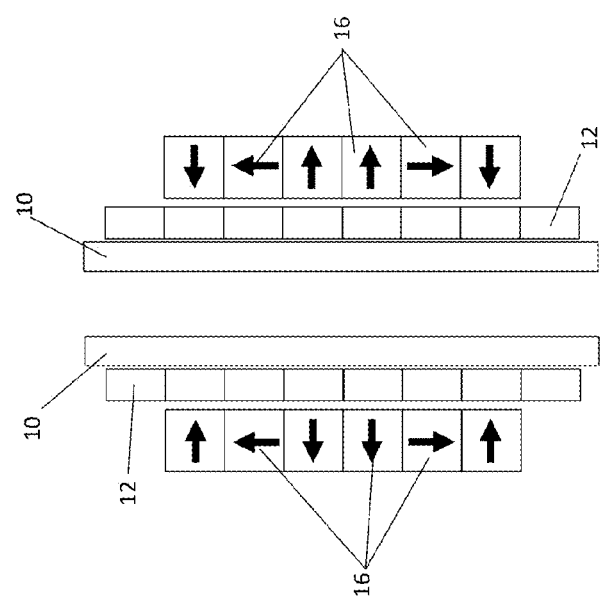

FIGS. 1A-B show one version of a linear actuator embodying at least some aspects of the inventions described herein. FIGS. 1C-F show the linear actuator during different stages of assembly to more clearly reveal its structure. Referring to FIG. 1A, the linear actuator includes a split core having two segments 10 made of soft ferromagnetic material, e.g. a relatively high magnetic permeability as compared to air, and low coercivity such as iron or steel or mu-metal. The two core segments are halves of a cylinder which when put side-by-side form a cylinder with a hollow central core region 11 extending along the longitudinal axis of the core. Optionally, insulating spacers (not shown) separate the two halves. Splitting the core into halves in this manner avoids eddy currents, which would otherwise run tangent to the coil windings. This reduces the eddy losses significantly from what they would otherwise have been. Also, using a split core enables the core to serve as a power supply line for the coils. Furthermore, as will be described in greater detail later, the hollow region within the core also provides a path through which coolant can be circulated to cool the coils during operation.

Referring to FIG. 1D, assembled onto the core is a stack of identical coils 12 arranged adjacent to each other to form a linear coil array. They are adjacent in that they are next to each other, either touching or separated by a small distance. In the described embodiment, the coils all have the same orientation relative to the core, i.e., they are wound in the same direction about the core. However, this need not be the case; the winding directions can alternate or be arranged in some other order depending on design requirements.

Referring to FIG. 1E, arranged on the linear coil array is a stack of ring magnets 16 (i.e., ring-shaped magnets) forming a magnet array. In the described embodiment, this magnet array is made up of a stack of three, adjacently arranged, ring magnets 16, each ring magnet is coaxially arranged on and circumscribes the coil array. This magnet array is mechanically held together to form a magnet assembly that is able to move back and forth along the length of the coil array (and the core) in response to forces imposed on the magnet array by currents applied to the underlying coils. That is, it is movably mounted with respect to the coil array. Movably mounted is meant to cover the case in which the magnet array is able to move along the coil array and core, if the array and core are held fixed, and the case in which the coil array is able to move relative to the magnet array, if the magnet array is held fixed.

The ring magnets 16, which are permanent magnets, e.g. rare earth magnets such as neodymium-iron-boron magnets, have their polarities arranged as indicated in FIG. 1B to achieve results similar to those achieved by a Halbach array. More specifically, the three ring magnets are arranged to augment the magnetic field on one side of the array (i.e., in the coil) while reducing the field on the other side of the array. The magnetic field in the uppermost ring magnet is oriented radially inward; the magnetic field in the middle ring magnet is oriented upward and parallel to the axis of the coil array; and the magnetic field in the lowermost ring magnet is oriented radially outward. The three ring magnets form a single magnetic circuit which functions to reduce (e.g. partially cancel) the field outside of the magnet array while enhancing the field on the inside of the magnet array. It is a single magnetic circuit because the arrangement of magnets generates a magnetic field that forms one loop.

When a current is applied to a coil 12 within the magnetic assembly, the interaction of the circumferential current within the coil and the radially directed magnetic field produces a force vector (the Lorentz force) that is parallel to the longitudinal axis of the coil array. Depending on the polarity of the current and the direction of the magnetic field, this will cause the magnet assembly to move along the longitudinal axis of the assembly in either one direction or the other.

In the described embodiment, the width of each coil (i.e., the dimension from one side to the other along the linear axis of motion of the actuator) equals the width of the ring magnets in the array along the same axis. In other words, the coils and the magnets have an equal period. Thus, when one ring magnet is aligned with a neighboring coil, all of the other ring magnets are also aligned with corresponding neighboring coils. This, however, is not a requirement. The coils can have a different width from that of the ring magnets. For example, it has been found that choosing a magnet ring width of 1.5 times the width of the coil (i.e., that two magnet rings span three coils in the coil array) can have advantages when it comes to driving the coils to control movement of the magnet assembly.

Referring to FIG. 1F, surrounding the stack of ring magnets is a sheath or sleeve 18 made of a ferromagnetic material that has high permeability relative to air and low coercivity. This sheath serves to provide a return path for the magnetic field outside of the array and thereby further reducing any field that might extend outside of the magnet assembly. It should be understood, however, that the sheath is optional in that the actuator is able to move without the sheath present.

FIGS. 2A-E show an embodiment that is similar to the embodiment shown in FIGS. 1A-E, except that its magnet assembly has two magnetic circuits formed by six ring magnets, i.e., two magnetic field loops. The first magnetic circuit is formed by the top three ring magnets and the second magnetic circuit is formed by the bottom three ring magnets. Notice that the arrangement of magnet polarities in the bottom circuit is the mirror image of the arrangement of the magnet polarities in the top circuit (i.e., a mirror image relative to a plane perpendicular to the axis of the coil array). Notice in this configuration that the magnetic moment is radially oriented in the same direction over the two ring widths at the center of the actuator. This increases the continuous region of the coil array over which a radially oriented magnetic field that is perpendicular to the coil current is generated.

An alternative way of fabricating the magnet ring is shown in FIG. 3. As indicated, instead of being a sold ring of magnetic material, each ring is made up of an array of similarly magnetized permanent magnets. In the illustrated example, there are twelve similarly magnetized permanent magnet cubes 17, which make up one ring. The cube magnets 17 are rigidly held within a frame (not shown in this figure). The fields of the magnets within a given ring are all oriented in the same cylindrically ordinate direction. So, in one ring the magnetic fields point radially inward; in another ring, they point radially outward; and in yet another ring they point in a direction that is parallel to the longitudinal axis of the core.

It should be understood that other shapes and/or relative sizes could be used for the individual magnets to achieve improved performance or ease of assembly. For example, without limitation, the magnets could have a trapezoidal shape or be segments of an annular ring.

A more detailed example of another embodiment of a linear actuator which employs many of the features just described will now be presented.

Figure 5:
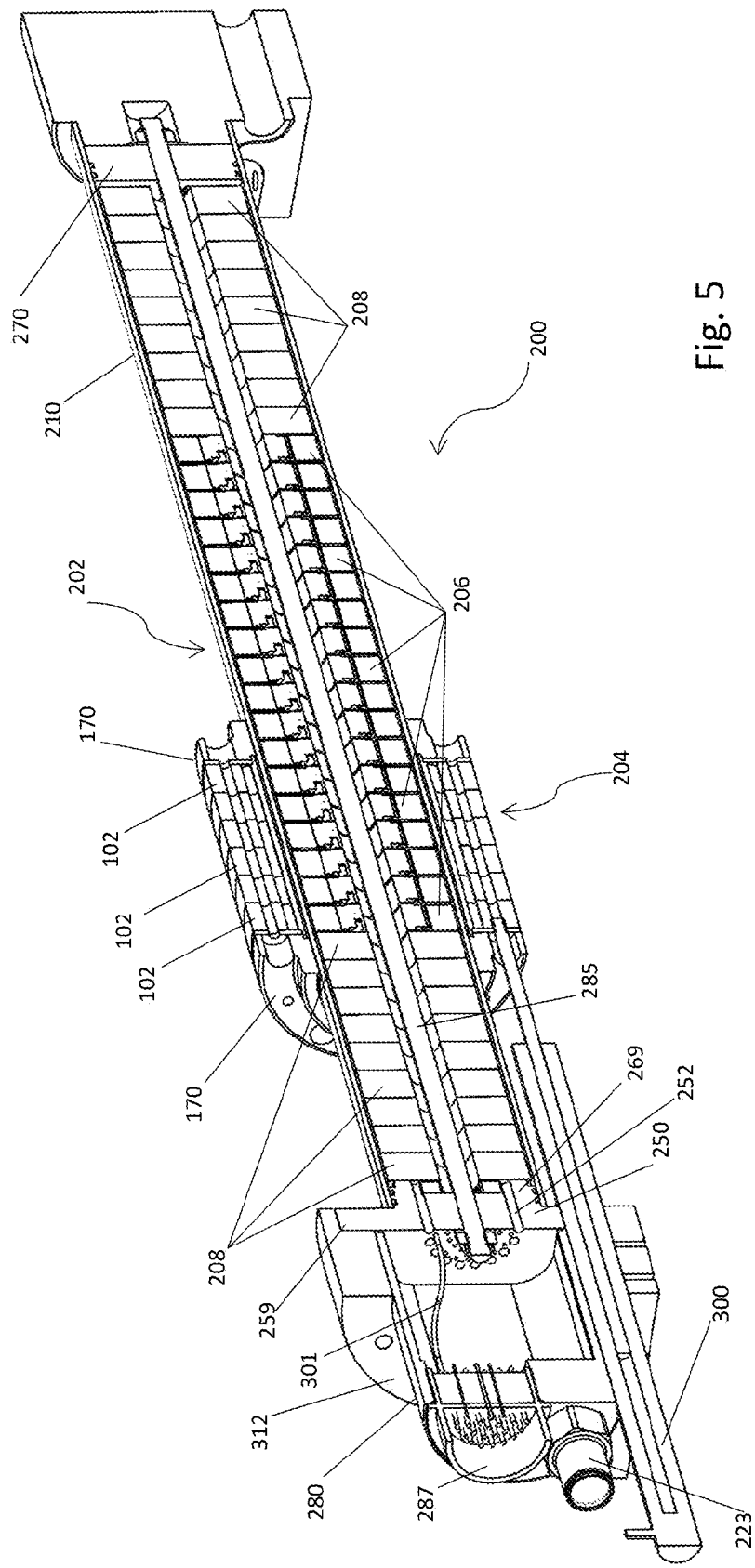
FIG. 5 shows a cross-sectional view of the linear tubular actuator of FIG. 4.

Referring to FIGS. 4 and 5, linear actuator 200 includes a cylindrically shaped coil array assembly 202 that includes a sequence of coils 206 within a carbon fiber tube 210. On both sides of the sequence of coils 206, there is a set of spacers 208 that are made of a rigid material, e.g. Delrin® (a product of E.I. du Pont de Nemours and Company), filling the rest of the tube. A cylindrically shaped magnet array assembly 204 encircles the carbon fiber tube 210 and the sequence of coils 206 that are within the tube. In the described embodiment, there are nine spacers 208 at one end, eighteen individually controllable coils 206 in the middle, and nine spacers 208 at the other end. When appropriate drive signals are applied to the coils 206, the magnet array assembly 204 can be made to move back and forth along the carbon fiber tube 210.

Referring to FIGS. 6A-D, each coil 206 is wound around two halves of a cylindrically shaped core segment 220 sandwiched between two circular, flat sidewalls 222*a* and 222*b*. This arrangement forms a spool onto which coil wire 224 is wound. Each circular sidewall 222*a* and 222*b* has six protrusions 223*a* and 223*b*, respectively, equally spaced around its periphery. When the coil 206 is inserted inside of carbon fiber tube 210, these protrusions 223*a* and 223*b* contact the inside wall of the tube and center the coil within the tube. They serve to stabilize the coils within the tube as well as define an annular region 213 (see FIG. 7) separating the cols from the inside wall of the carbon fiber tube and through which coolant can be flowed to cool the system (to be further described later).

One sidewall 222*a* has a hole 226*a* formed at its center with a diameter that is equal to the inside diameter of the assembled circular core segment. The other sidewall 222*b* has a hole 226*b* formed at its center with a radius that is larger than the inside diameter of the circular core segment but smaller than the outside diameter of the core segment. The side of core segments onto which the sidewall 222*b* is mounted includes a flat, raised circular area 228 having an inside radius that is slightly smaller than the inside radius of hole 226*b* so that sidewall 226*b* fits onto and is aligned by the raised area 228.

There are two circular arrays of equally spaced holes formed through the spool passing from one side to the other. There is an outer circular array of holes 230 that pass through sidewall 222*a*, core segment 220, and sidewall 222*b*. There is also an inner circular array of holes 232 that pass through sidewall 222*a* and through core segment 220 The inner circular array of holes, the centerline of the array having a diameter that is less than the diameter of raised area, does not pass through the other sidewall 222*b*, as indicated in FIGS. 6C and D. In the described embodiment there are eighteen holes in each array 230 and 232 (i.e., the number being equal to the number of coils in the array). As will be described shortly, these two arrays of holes are used to carry wires that electrically connect the coils to external circuitry.

Sidewall 222*a* also includes a ring of six alignment posts 227 located nearer to the outer perimeter of the sidewall. Sidewall 222*b* includes a ring of eighteen equally spaced holes 234 at the same radius as the ring of alignment posts 227. Note that the holes of the three arrays of holes 230, 232, and 234 are also aligned angularly, i.e., one hole in each array is collinear with a hole from each of the other two arrays of holes along a single radial vector. When the coils are stacked together to form the coil array, sidewall 222*a* of one coil abuts sidewall 222*b* of the neighboring coil and the alignment posts on sidewall 222*a* rest within the alignment holes on sidewall 222*b*, thus preventing the two coils from rotating with respect to each other and assuring that all of the holes in the various arrays in one coil align with the corresponding arrays of holes in the neighboring coils.

In sidewall 222*a* there are two openings 236*a* and 236*b*, at locations that are at radially opposite each other and each of which exposes a different one of the underlying core segments 220. For opening 236*a*, there is a wire socket 238*a* (barely visible in FIG. 6C) located behind a neighboring hole in the outer array of holes; and for opening 236*b*, there is another wire socket 238*b* (more clearly visible in FIG. 6D) located behind a neighboring hole in the inner array of holes 232. Wire socket 238*a* is electrically connected (e.g. by applying solder through hole 236*a*) to the inner wire of the coil that is wound onto the core and wire socket 238*b* is electrically connected (e.g. by applying solder through hole 236*b*) to the outer wire of that coil. There is also a radial slot 239 formed in sidewall 222*a* which enables the outer coil wire to be routed back to the hole 236a where it can be soldered to the corresponding wire socket 238a.

When the coils are stacked up within the tube, each coil in that stack is rotated relative to the next coil by +360/18 degrees (e.g. 1/18 of a full rotation in a common direction (e.g. clockwise). The alignment posts on the sidewall of each coil assures that holes through each coil are aligned with corresponding holes in all of the rest of the coils in the stack thereby forming two arrays of passages extending down the length of the segmented core from one end to the other. One array of passages (referred to as the outer array of passages) corresponds to the outer array of holes 230 and the second array of passages (referred to as the inner array of passages) corresponds to the inner array of holes 232. Because of the rotation of each coil in the stack relative to its neighbor, a wire socket 238 will block each passage at some point along the length of that passage. The coil at which the blockage occurs will be different for each passage. Referring to the outer array of passages, it should thus be readily apparent that the wire socket 238 of each coil 206 is accessible through a different one of the eighteen passages and similarly for the inner array of passages. An electrical connection is made to a wire socket 238 by passing an insulated wire with an electrically exposed end down a passage until the exposed end of that wire seats within the wire socket for that passage. Thus, electrical connections are made to one end of each coil through the outer passages and electrical connections are made to the other end of each coil through the inner passages.

The spacers at either end of the coil array assembly are shaped similarly to that of the coils. That is, each one is cylindrically shaped with a hole down its axis having a diameter equal to the inside diameter of the core. All of the spacers at the end through which the wires will need to pass also include two arrays of holes corresponding to the two arrays of holes 230 and 232 in the coils. Each spacer also includes alignment features that guarantee that the hole arrays will align with each other to form passages through which the wires can pass. Of course, the spacers at the other end of the coil array assembly 202 do not need to have the holes since no wires pass through those spacers.

Spaced around the outside perimeter of each spacer there is an array of longitudinally arranged ribs or protrusions (not shown). These ribs or protrusions correspond to the protrusions 223a and 223b around the perimeter of the coil sidewalls 222a and 222b, respectively, and serve a similar function. That is, the ribs or protrusions on the spacers, like the protrusions on the perimeter of the coil sidewalls, establish an annular coolant flow region 213 which is bounded on one side by the outside perimeter of the spacers 208 and is bounded on the other side by the inside wall of the carbon fiber tube 210.

Note that in the embodiment being described, as in the embodiment of FIG. 1, there is a core of soft magnetic material that extends along the inside of the region formed by the sequence of coils. Unlike the prior embodiment, however, this core is not made up of two solid halves running from one end of the coil array to the other but rather it is made up of individual core segments in each coil. In addition, each coil segment is electrically isolated from neighboring core segments and is electrically connected to the coil winding within its coil. This segmented structure yields the advantage of ease of manufacture in comparison to the previously illustrated approach. Rather than sliding each coil onto the solid continuous core, the core is formed by simply stacking the coils together and inserting the wires down the aligned holes afterwards to make the electrical connections to the individual coils in the array.

Referring back to FIGS. 4 and 5, each end of the carbon fiber tube 210 is capped by a plate which forms part of the coolant system. At the input end, there is a flow distribution plate 250 through which coolant is introduced into the annular region 213 running along the inner surface of the carbon fiber tube 210 and out of which coolant flows after circulating through the inside of the coil array assembly 202. At the other end of the tube, there is a flow redirection plate 270 that redirects the flow of coolant from the outside annular region near the inside wall of the carbon fiber tube 210 toward the central passage extending down the length core region where the coolant flows back to the other end and out of the coil array assembly 202.

Referring to FIGS. 8A and B, the flow distribution plate 250 has a cylindrically shaped extended portion 269 that fits into the tube 210 where a seal is formed between the extended portion and the inside wall of the tube 210 by several O-rings which are held in corresponding grooves 257 surrounding the extended portion 269. Plate 250 also has a flange portion 259 which butts up against the tube 210 and limits the extent to which the flow distribution plate 250 can be pushed into the tube 210.

Referring to FIG. 9, the flow redirection plate 270 is cylindrically shaped with a diameter that is slightly less that the inside diameter of the tube 210 thereby enabling it to slide completely into the tube 210 where a seal is formed between the plate 270 and the inside wall of the tube by O-rings that are held in corresponding grooves 277 encircling the flow redirection plate 270. There is a hole 281 through the center of the flow distribution plate 250 and a corresponding hole 283 through the center of the flow redirection plate 270. A rod 285 with threaded ends passes down the center of the coil array assembly 202 from one end the other with the threaded ends extending through the holes 281 and 283 in the two end plates 250 and 270, respectively. Nuts on the threaded ends of the rod 285 hold the entire assembly together and compress the stack of spacers and coils between the two end plates 250 and 270.

On the side of the flow redirection plate 270 that is against the last spacer there are six pie-shaped raised islands 290 that form six radially arranged channels 291. These six channels 291 provide paths through which coolant that arrives via the annular region surrounding the coil array 212 can flow down to the central passage within the coil array assembly 202, through which it flows back to the flow distribution plate 250.

The flow distribution plate 250 has a coolant port 251 through which coolant is flowed into the coil array assembly 202 and it also has a circular array of passages 252 out of which the coolant flows after it has been circulated through coil array assembly 202. It further includes two circular arrays of holes 255 and 256 through which wires pass into the core for connection to the coils. As can be seen, there are eighteen holes in each circular array, one hole for each coil in the array.

Referring to FIG. 8B, on the inside of the flow distribution plate 250, port 251 provides access to an annular region 257 surrounding the inside edge of the extended portion 269. This annular region 257 is aligned with the annular channel 213 formed between the inside of the carbon fiber tube 210 and the outside perimeter of the stack of coils 206 and spacers 208 (see FIG. 7). On the inside of plate 250 there is also an array of channels 253 which extend radially inward from the passages 252 to a hollow region 258 at the center.

The hollow region 258 aligns with the core region extending down the length of the coil array assembly 202. The array of channels 258 provides a path for the coolant within the core region to flow to the passages 252 and exit from the coil array assembly 202.

Figure 7:
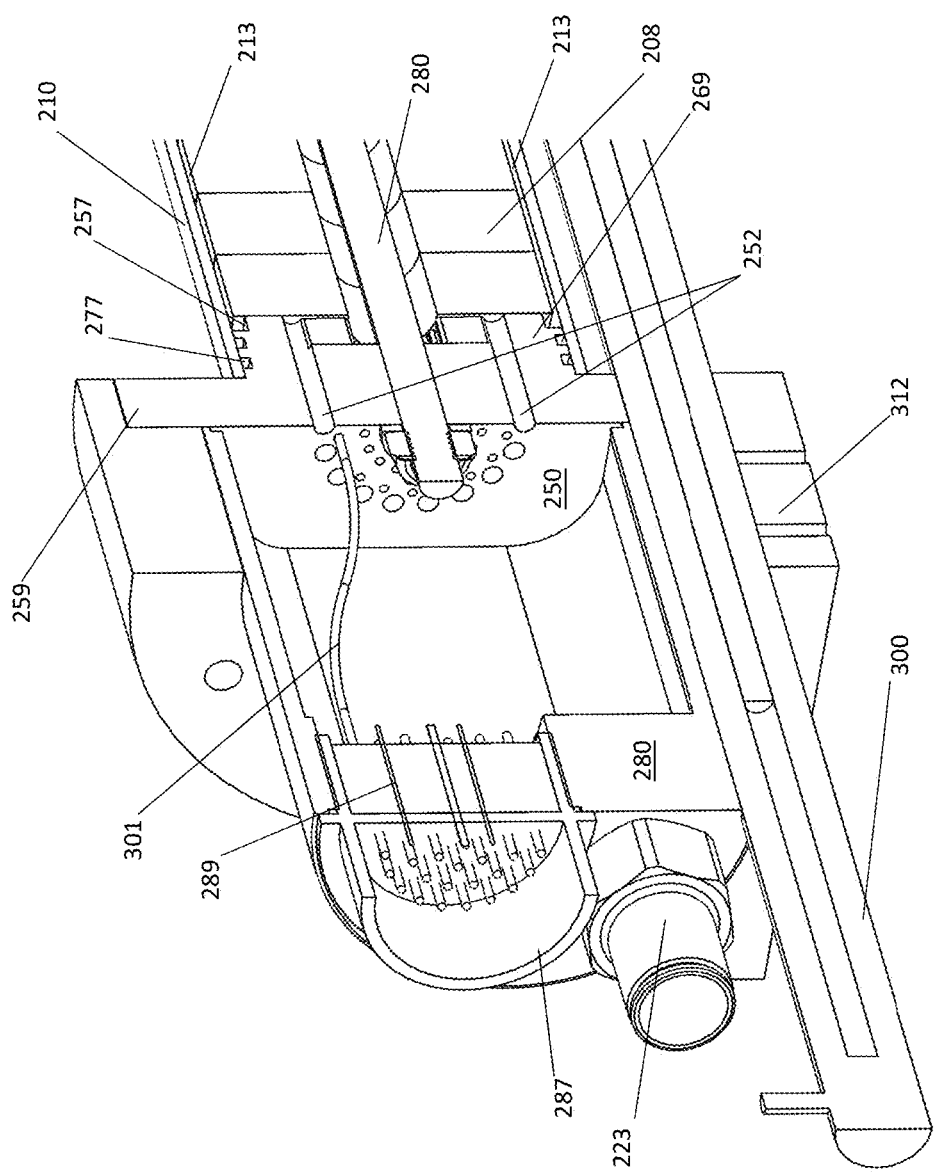
FIG. 7 shows a close up cross-sectional view of the end of the linear tubular actuator of FIG. 4 where the electrical and coolant connections are located.
Figure 10B:
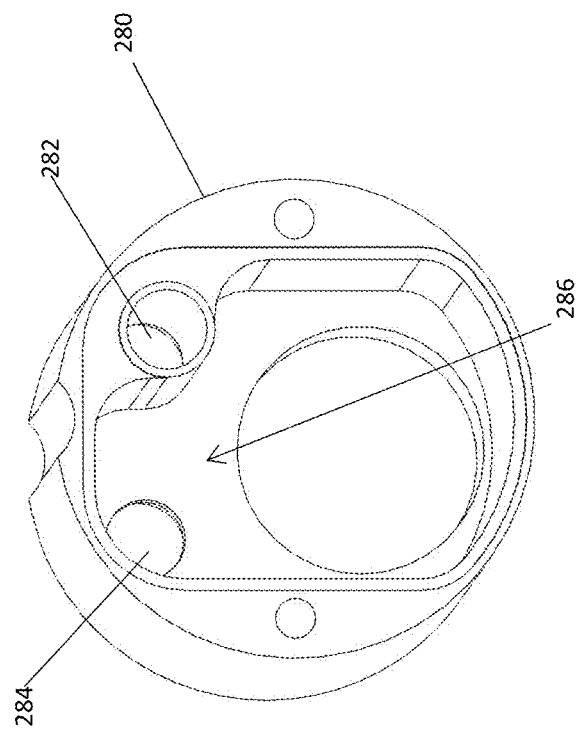
FIGS. 10A-B show perspective views from the front and the back of the coolant manifold for the linear tubular actuator of FIG. 4.
Figure 10A:
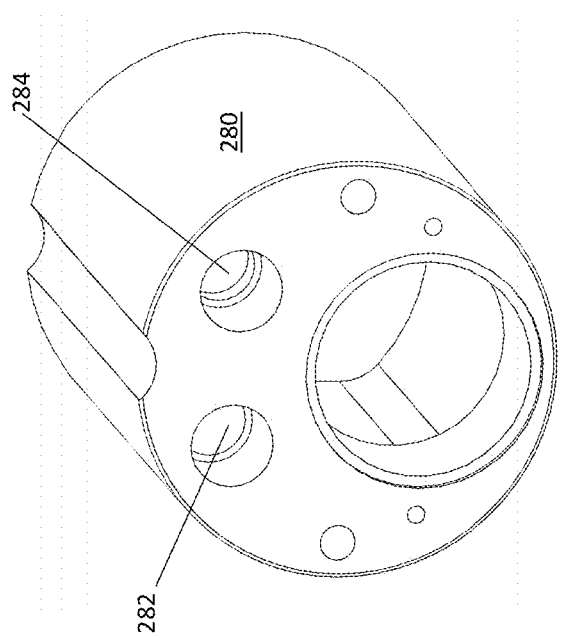

Referring to FIGS. 7, 10A and 10B, there is a manifold 280 that abuts the flow distribution plate 250 and serves to couple an incoming flow of coolant to the coolant port 251 (see FIGS. 8A and B) and to couple an outflow of coolant from the array of passages 252 out to an external pumping/cooling system (not shown). The manifold 280 includes an intake port 282 to which a supply line 221 (see FIG. 4) is connected and an output port 284 to which an outlet line 223 is connected. The intake port 282 aligns with and is connected to the coolant port 251 in distribution plate 250. Manifold 280 also includes an internal chamber 286 to which the output port 284 is connected and which aligns with the array of passages 252. Coolant flows from supply line 221 through intake port 282 into coolant port 251 into the coil array assembly 202. After circulating through the array, the coolant exits from the coil array assembly 202, by flowing through array of passages 252 into the chamber 286 and out the output port 284 and to outlet line 223.

Referring to FIG. 7, the manifold also includes an opening into which is fitted a wire connector interface 287 having thirty-six pins 289, two pins for each of the coils in the coil array. The wires 301 that extend down the aligned passages 230 and 232 (see FIG. 6A) and connect to the coils are connected to these pins 289. In FIG. 7, only one of the wires 301 is shown to avoid creating a visually confusing illustration. However, it should be understood that in the fully assembled device, there would be a bundle of 36 wires coming out of the flow distribution plate 250 and connecting the 36 pins in the wire connector interface 287. Note that the wire connector interface 287 provides a water-tight seal around all of the pins and is itself secured in the manifold with a sealant (e.g. gasket or O-ring) that assures that the manifold assembly will also be water tight.

The wires 301 in the region between 250 and 280 (FIG. 7) are flexible and make a connection between the pins inside of 287/9 and separate rigid wires that have been pushed through passages 230 and 232. Flexibility is important between 250 and 280 to change diameter of the location of connection. Rigidity is important through 230 and 232 in order to ensure that the wires can be easily pushed through the entire channel length. The interconnection in the described embodiment is made by a press-fit connection from the rigid wires to the flexible wires and the connection from the flexible wire to the pin is soldered.

Figure 11B:
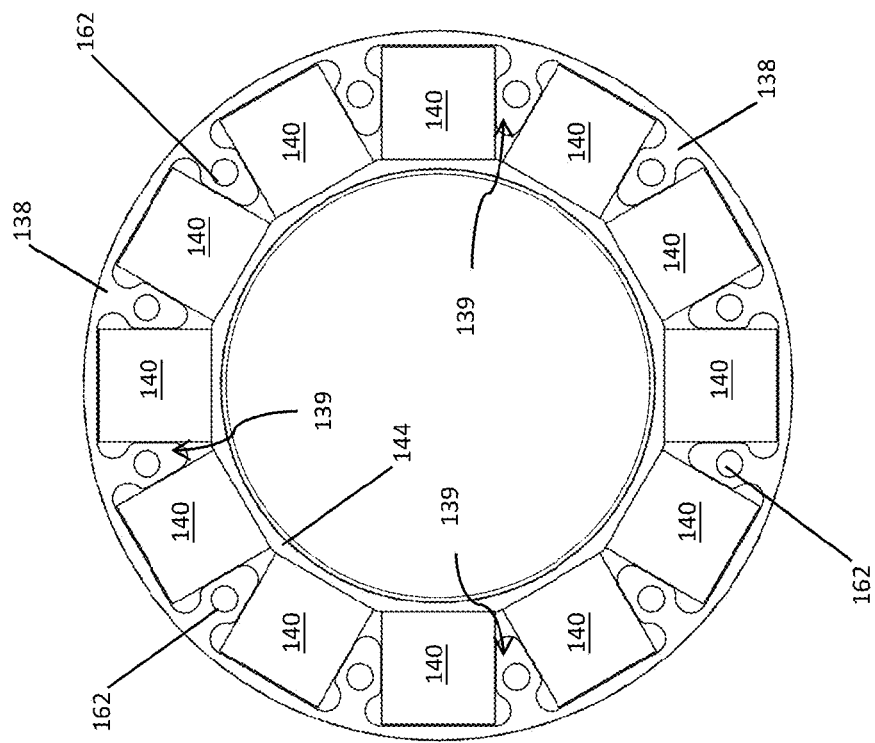
FIGS. 11A-B show views of the magnet array assembly for the linear tubular actuator of FIG. 4.
Figure 11A:
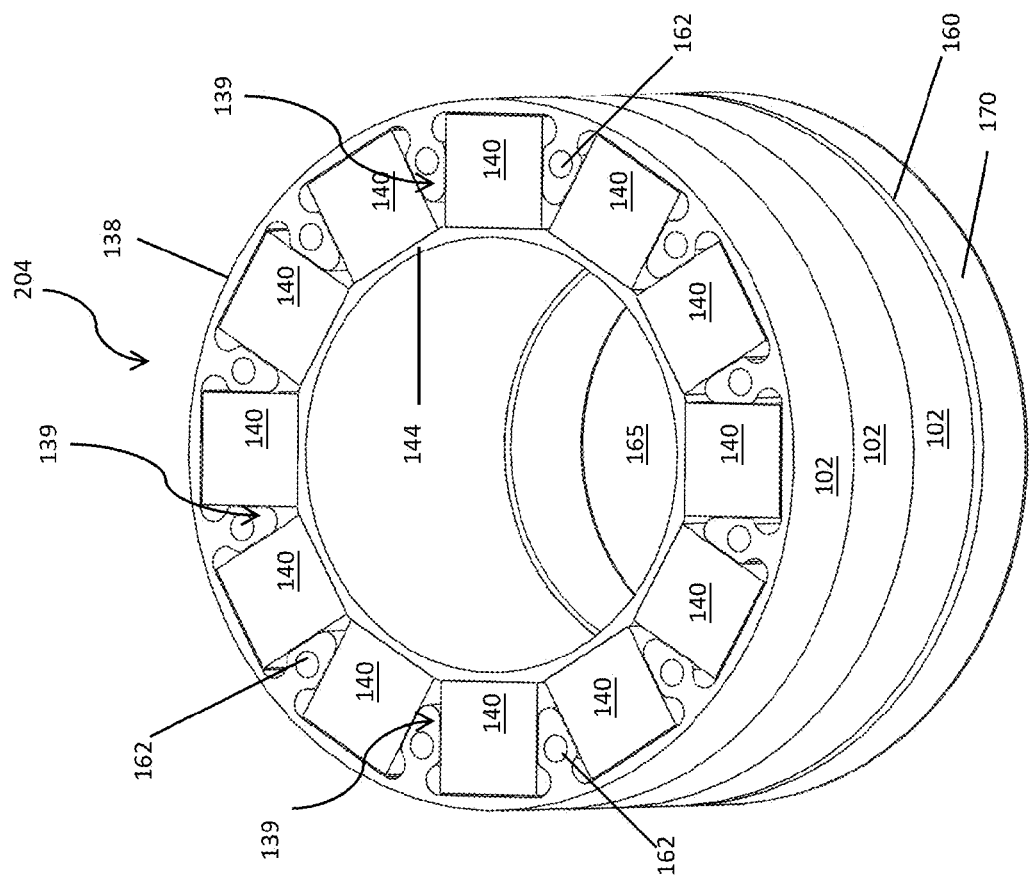

The construction of the magnet array assembly 204 and a magnet ring 102 is shown in FIGS. 11A-B which present a cross-section through one of the magnet rings of the magnet assembly. Each ring is made up of an aluminum annular form 138 that has twelve radially directed, inward extensions 139 defining twelve slots around annular form 138 for receiving magnets 140. Annular form 138 surrounds an internal cylindrical sleeve 144. A cubic shaped permanent magnet 140 is positioned within each of the slots to form a circular array of twelve magnets 140 in the space between annular ring 138 and internal sleeve 144. In any particular magnet ring, all of the magnets have their magnetic fields oriented in the same cylindrically ordinate direction, i.e., they are all in the same radial direction or they are all in the same longitudinal direction.

A stack of six of annular forms 138 with their magnets 140 is assembled onto internal sleeve 144, with the magnets in the six layers oriented into the appropriate directions to achieve results similar to those achieved by a Halbach array, namely, enhance magnetic field on one side while reducing the magnetic field on the other. The entire arrangement of six annular forms with the arrays of magnets are positioned between two aluminum end plates 160 that are, in turn, held together by bolts (not shown) that pass though holes 162 in the aligned extensions 139 on annular forms 138. At each end of the magnet array assembly, there is a bushing 170 mounted onto each end plate 160 and held in place by bolts (not shown) that pass through the holes 162. Bushing 170, which is made of a polymer material, e.g. Delrin®, has an outside diameter equal to the outside diameter of the magnet rings 102 and an inside diameter that is smaller than the inside diameter of sleeve 144 but slightly larger than the outside diameter of the carbon fiber tube 210 (see FIG. 5). Thus, when the magnet array assembly 204 is assembled onto tube 210, the bushings 170 support the magnet array assembly 204 on the tube 210 and enable it to slide back and forth along the tube in response to drive signals applied to the coils.

In the described embodiment, there is a linear position sensor 300 (e.g. linear potentiometer or encoder) that external control circuitry uses to determine the position of the magnet array assembly 204 during operation. The position information enables the controller to determine which coils must be activated in order to move the magnet assembly to the next desired location. Also at opposite ends of the liner actuator, there are support blocks 312 and 314 for supporting the actuator and mounting it on another structure (see FIG. 4).

Figure 12A:
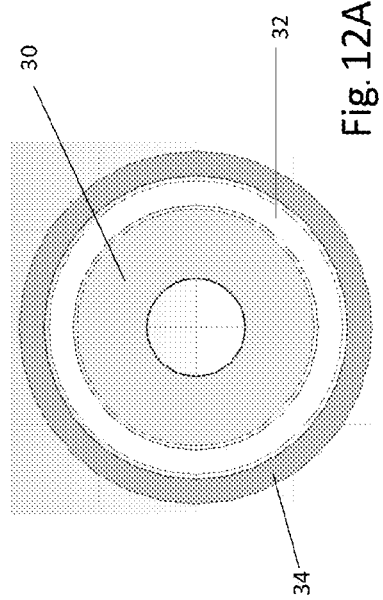
FIGS. 12A-B show another embodiment of a linear tubular actuator in which the magnet array assembly is within the coil array.
Figure 12B:
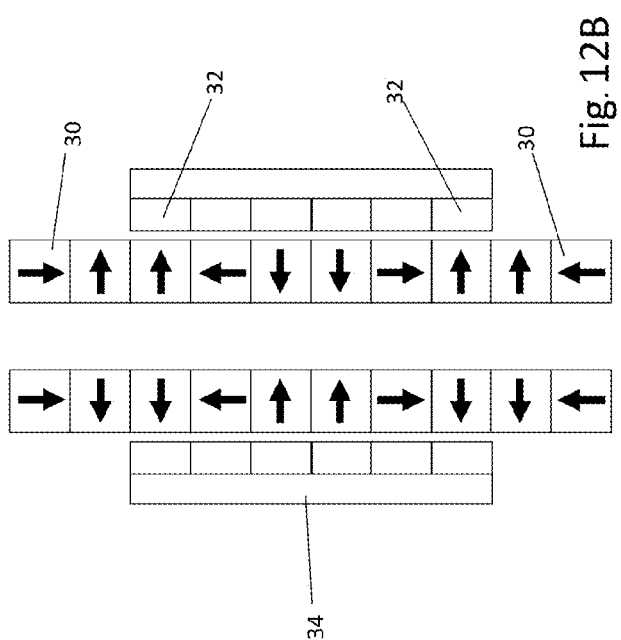

FIGS. 12A-B show another embodiment in which the coils of the coil array surround and are outside of the magnetic rings of the magnet array. The core is made up of an array of ring magnets 30, the height of which array is determined by the extent of motion that is desired from this actuator. The ring magnets in the array have their magnetic poles arranged so that the magnetic field on the outside of the array is strengthened and the magnetic field on the inside of the core is reduced (or canceled). Surrounding the magnetic core is a coil array assembly made up of a stack of identical individual coils 32. And surrounding the coil array is a sheath 34 of soft magnetic material. In this case, the coil array could move back and forth along a stationary magnet array, in response to applying appropriate drive current to the coils. Or alternatively, the coil array can be held stationary and the magnet array can move back and forth.

Figure 13A:
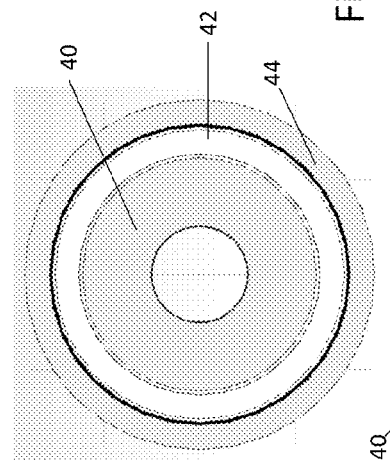
FIGS. 13A-B show another embodiment of a linear tubular actuator in which there are magnet array assemblies both within and outside of the coil array.
Figure 13B:
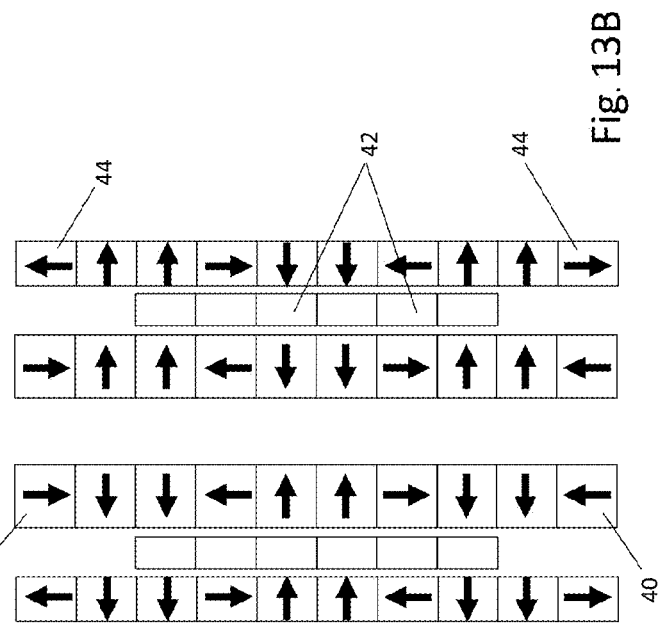

FIGS. 13A-B show an embodiment in which there is a coil array between two magnetic arrays, with the coil array circumscribing one of the magnet arrays and the second magnet array circumscribing the coil array and first magnet array. The core is made up of a first array of ring magnets 40, the height of which array is determined by the extent of motion that is desired from this actuator. Surrounding the magnetic core is a coil array assembly made up of a stack of identical individual coils 42. And surrounding the coil array is a second array of ring magnets 44, the height of which array is equal to the height of the first array of ring magnets. The ring magnets in both arrays are arranged in a similar arrangement to the modified Halbach array described earlier. More specifically, the ring magnets in the inner array have their magnetic poles arranged so that the magnetic field on the outside of the array is strengthened and the magnetic field on the inside of the core is reduced. The ring magnets in the outer array have their magnetic poles arranged so that the magnetic field on the inside of the array is strengthened and the magnetic field on the outside of the array is reduced.

As in the case of the embodiment of FIGS. 2A-E, the coil array can move back and forth along stationary magnet arrays, in response to applying appropriate drive current to the coils. Or alternatively, the coil array can be held stationary and the magnet arrays can move back and forth.

The linear actuator described above is driven into motion by means of Lorentz force that is generated when electrical current is applied to one or more coils in the path of magnetic flux generated by the magnet assembly. In general, the vector component of magnetic flux that contributes towards force generated along the axis of motion of the magnet assembly is perpendicular to both the axis of motion and the direction of electrical current flow, according to the Lorentz Force Law. This electrical current is generated by means of electronic drive circuits attached to the coils.

In order to control the position of the linear actuator's magnet assembly efficiently, it is necessary to separately control the current flowing to each coil within the linear actuator, sending higher current to coils that coincide with higher magnetic flux density and lower current to coils that coincide with lower magnetic flux density. In the limit, maximal efficiency of a particular linear actuator geometry would be obtained by actuating only the single coil or coils in the coil array that coincides with the highest magnetic flux density, in order to generate the largest amount of force per unit power dissipated. However, there are other practical reasons for actuating multiple coils at a time. As the position of the magnet assembly changes, it is useful to gradually increase the current to one coil while gradually decreasing current applied to a second coil, in order to avoid rapid changes in the drive signal that may induce elevated electrical losses in the system. In addition, there is an upper limit on voltage that may be applied to a single coil, in order to remain with allowable limits of the operating voltage of the drive electronics and also remain within allowable limits of the permissible heat generation within a single coil. Given these operating constraints, although the efficiency of operation may be somewhat reduced from a theoretically maximal value, higher total force output from the linear actuator may be obtained by applying electrical current to multiple coils within the flux path of the magnet assembly.

Figure 16:
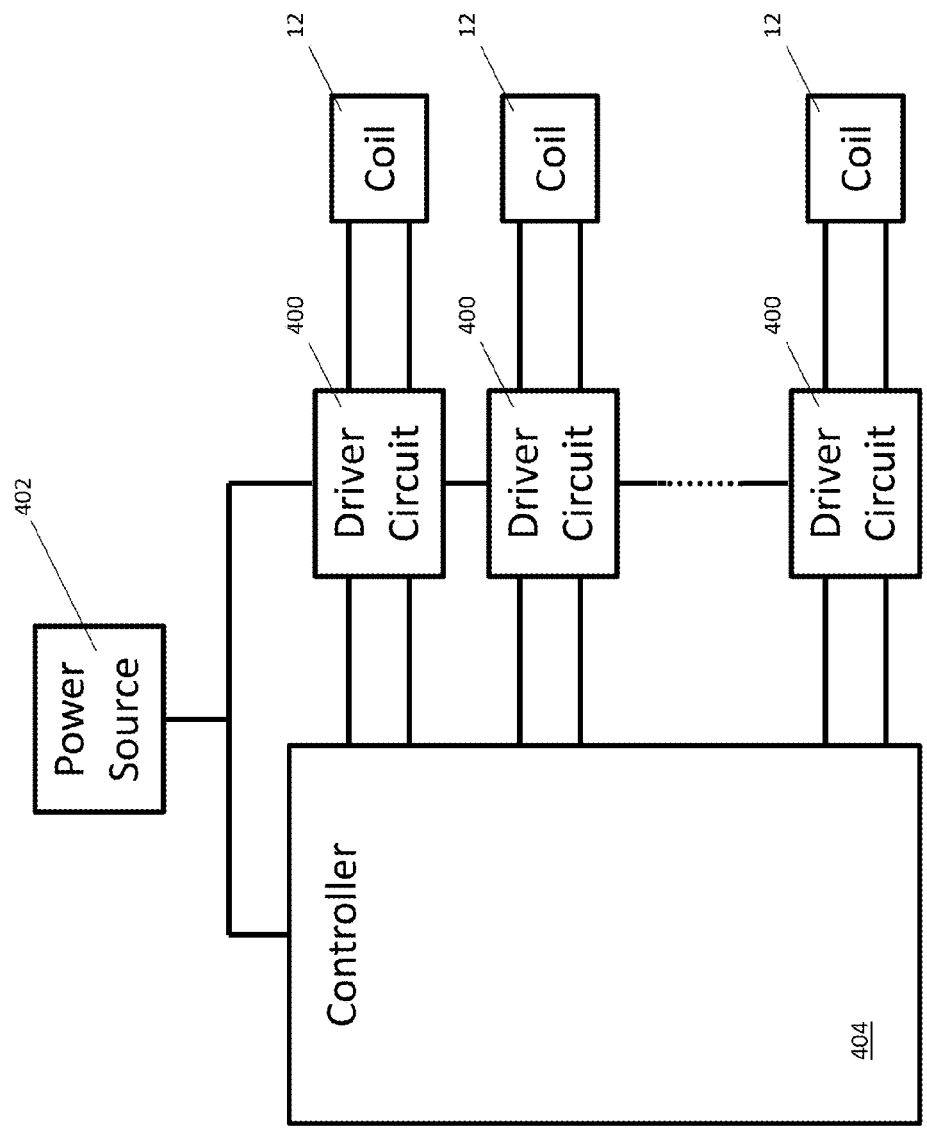
FIG. 16 shows a block diagram of an actuator control system.

Referring to FIG. 16, in order to achieve control over electrical current flowing through each coil in the assembly of coils 12 in the linear actuator, each coil 12 is connected to an individual set of measurement and drive electronics (e.g., driver circuits 400) that include at a minimum a power amplifier and a current measurement sensor. In addition the electronics may include connection to one or more voltage measurement sensors and temperature measurement sensors. Each power amplifier receives input from a constant power source 402 and in the presence of a modulating signal input applies a modulated power output to a coil, with the modulating signal input controlling the waveform of the modulated power output. The modulating signal input is either a digital or analog signal that is controlled by a control algorithm that is running in the microprocessor of a central controller 404.

The control algorithm determines the magnitude of current that each coil will receive, as a function of one or more of the following: the current Inertial Parameters of the linear actuator; the target Inertial Parameters of the linear actuator; electrical current in the coil; electrical voltage across the coil; temperature of the coil or ambient environment; mass of the magnet assembly; and other physical parameters of the linear actuator or its surrounding environment. Inertial Parameters of the linear actuator include the position, velocity, and acceleration of the magnet assembly. The linear actuator control algorithm is implemented on computational electronics that take measurements from the measurement electronics and send modulating control signals to the drive electronics.

Multiple options are available in determining the physical location of the computational electronics. In the described embodiment, a centralized set of computational electronics may be used to send and receive communications between each set of drive and measurement electronics. Alternatively, each set of measurement and control electronics may be connected to a separate set of computational electronics that communicates with one or more other sets of computational electronics. Or, a central set of computational electronics may communicate with one or more other sets of computational electronics, each of which are connected to a set of measurement and control electronics. In this manner, the control algorithm may be implemented either within a centralized or distributed control architecture. Further, the communication between computational electronics may be performed by one or more of a number of possible mechanisms including direct electrical interconnection, fiber optic interconnection, or wireless communication.

Figure 14:
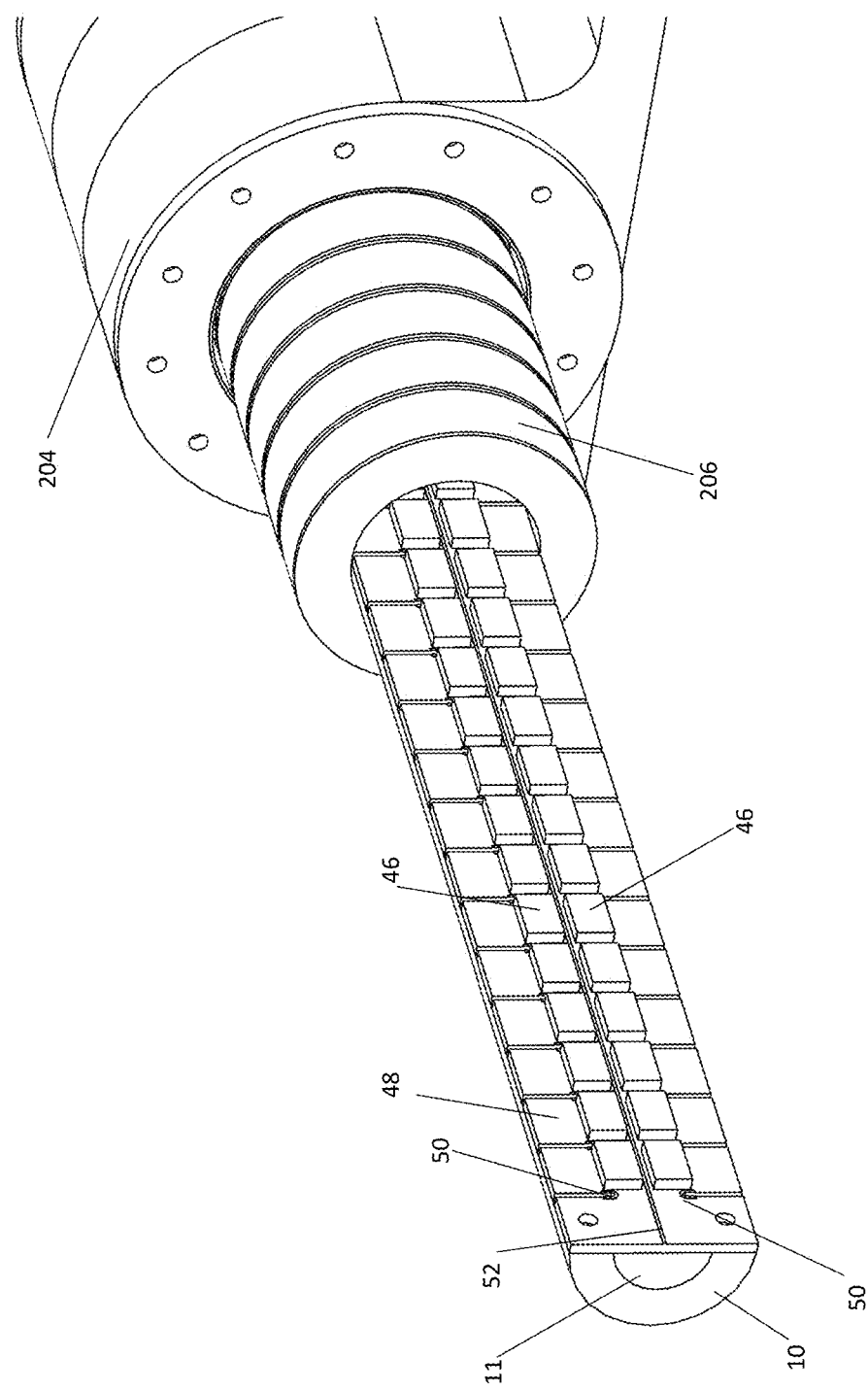
FIG. 14 shows an embodiment in which drive circuitry is placed within the hollow core region formed by the cylindrical core and in proximity to the coils that are driven.

Referring now to FIG. 14, the hollow core region formed by the assembled core segments 10 also provides space for holding the individual drive circuits for the coils so that each drive circuit can be located nearby or within the coil that it drives. FIG. 14 shows a partially assembled array of coils 206 that includes the drive circuits 46 on a circuit board 48 within the hollow core region 11 and proximate to the coil which it drives. One of the core segments 10 has been removed to show the circuit board that is sandwiched between the two segments. For each driver circuit, the circuit board 48 includes two contacts 50 in the form of metal inserts into which the two wires from the neighboring coil are soldered. Running along the length of the circuit board 48 is a control bus 52 for operating the drive circuits and applying the desired current waveform to the respective coils. Each drive circuit 46 is connected to this control bus; and the control bus 52 connects to a controller (not shown) that is external to the actuator. Of course, the control functions could also be partially or completely distributed among the circuits that are on the circuit board and located next to the individual coils. In this embodiment, the core segments 10 are made of an electrically conductive material and serve as the power bus for the drivers and the coils which are electrically connected to that bus.

An alternative approach to placing the drive circuits 46 within the coil stack is to fabricate that circuitry on a sidewall 222b of the coil 206, as indicated in FIG. 6B. In essence, each coil can have the drive circuitry on one (or both) of its sidewalls and this circuitry can then be connected to a power bus and a control bus that runs down through the central core, e.g. via a PCB or wires at the center.

Figure 15:
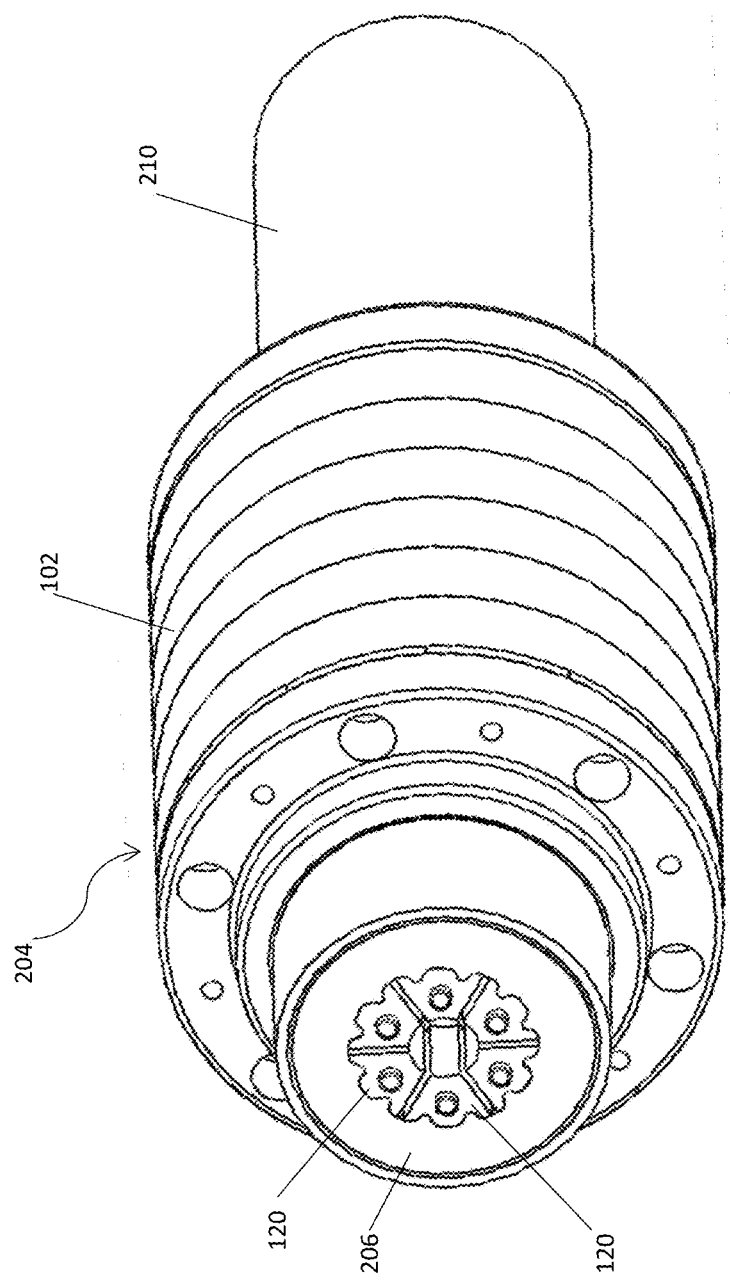
FIG. 15 shows a linear tubular actuator with a 6 segment core.

In the embodiment illustrated in FIG. 15, the core is made up of six electrically conducting segments 120 that are electrically isolated from each other. They form a 3-phase electrical bus for providing AC electrical power to the coils. The drive circuitry (not shown) is located outside of the actuator and the drive signals are sent to the coils via the six segments to which the coils are electrically connected. Each pair of bus segments is connected to a group of coils corresponding to every third element in the coil array. For example, one pair of segments is connected to the first coil, the fourth coil, the seventh coil etc. A second pair of segments is connected to the second coil, the fifth coil, and the eighth coil, etc.

In the embodiments described above, it was implied that the smaller array, e.g. the magnet array in the case of FIG. 1 or the coil array in the case of FIG. 13 was the moving element. However, this need not be the case. The opposite could be true, namely, the smaller array can be held fixed and the larger array moves in response to the drive currents. Or, depending on the linkages that are used, both can move relative to the assembly on which the actuator is mounted.

Though the devices illustrated herein are all linear tubular actuators, the principals can be just as readily applied to devices which are not linear and not cylindrical. For example, the array of coils could lie along a curved path which could be an arc of or the complete circumference of a circle. In that case, it might form part of a rotary engine that controls the movement of a rotating shaft to which the actuators are connected. In general, the curved path that the array of coils follows does not need to be linear or circular, and can follow a much more complex shape.

In addition, the coils need not be circular in cross-section as they were described above. They could have other cross-sectional shapes, such as rectangular, oval, or oblong, to name a few. Also, the magnets need not necessarily encircle the coil assembly. They could be located on opposite sides of the rectangular cross section of a coil array with no magnets on the other two opposed sides. Or they could be on only one side of the coil array, though such an arrangement would be much less efficient.

Other embodiments are within the scope of the following claims. For example, an output manifold can be located at the opposite end of the tube from the input manifold. In that case, the coolant would flow in one end of the tube and out the other.

What is claimed is:

1. An electromagnetic actuator comprising:
   a core having a longitudinal axis, said core comprising a material having a high magnetic permeability relative to air and defining a hollow inner region extending the length of the core and through which a liquid coolant flows during operation;
   an array of coils sequentially arranged on the core, each coil of the array of coils being wound around the longitudinal axis of the core;
   a magnet assembly movably mounted along the array of coils, said magnet assembly having a coil side facing the array of coils and an opposite side facing away from the array of coils, said magnet assembly comprising an array of permanent magnets sequentially arranged along the array of coils in a direction parallel to the longitudinal axis;
   a sleeve surrounding the array of coils, wherein the magnet assembly rides along and outside of the sleeve, wherein said sleeve has an inside surface that is spaced apart from the array of coils to form an outer coolant flow channel surrounding and extending the length of the array of coils and through which the liquid coolant flows during operation;
   a manifold located at one end of the core, said manifold having a first port and a second port, the first port for receiving the liquid coolant and delivering the liquid coolant to the hollow inner region of the core for cooling the array of coils and the second port for allowing the liquid coolant to flow out of the electromagnetic actuator after flowing through the hollow inner region of the core; and
   a flow redirection plate located at an opposite end of the core from the manifold, said flow redirection plate defining one or more channels for transferring coolant between the hollow inner region of the core and the outer coolant flow channel.

2. The electromagnetic actuator of claim 1, wherein the array of coils is a linear array of coils.

3. The electromagnetic actuator of claim 1, wherein the magnet assembly comprises a plurality of arrays of permanent magnets, said first-mentioned array of permanent magnets being one of said plurality of arrays of permanent magnets, said plurality of arrays of permanent magnets being arranged about the array of coils to form a plurality of magnetic rings, each of which surrounds the array of coils.

4. The electromagnetic actuator of claim 1, wherein the array of permanent magnets is an array of permanent ring magnets, each one encircling the coil array.

5. The electromagnetic actuator of claim 1, wherein the core comprises a plurality of core segments and wherein each core segment of the plurality of core segments is associated with a different coil of the array of coils.

6. The electromagnetic actuator of claim 1, wherein the coils in the array of coils are all individually controllable.

7. The electromagnetic actuator of claim 1, wherein the sleeve is cylindrically shaped.

8. The electromagnetic actuator of claim 1, wherein the channel surrounding and extending the length of the coil array is a generally annular shaped channel.

9. The electromagnetic actuator of claim 1, wherein the core comprises iron and/or steel.

10. The electromagnetic actuator of claim 1, wherein the coils in the array of coils are cylindrically shaped.

11. The electromagnetic actuator of claim 1, wherein the array of magnets includes three magnets in sequence with the directions of the magnetic fields of three magnets being selected and arranged to yield +T, +L, −T,
    wherein +T indicates a magnetic field that is oriented transverse to the longitudinal axis,
    wherein −T indicates a magnetic field that is oriented transverse to the longitudinal axis and in a direction that is opposite to +T, and
    wherein +L indicates a magnetic field that is oriented parallel to the longitudinal axis.

12. The electromagnetic actuator of claim 1, further comprising a flow distribution plate between the manifold and the sleeve, said flow distribution plate defining one or more channels for transferring coolant between one of the first and second ports of the manifold and the outer coolant flow channel surrounding the coil array.

13. The electromagnetic actuator of claim 1, wherein the core includes one or more passages for holding wires that electrically connect to the coils in the array of coils.

14. The electromagnetic actuator of claim 1, wherein the core comprises two segments each of which extends down the length of the array of coils, the two segments serving as electrically conductive lines for delivering power to the coils in the array of coils.

15. The electromagnetic actuator of claim 1, wherein each permanent magnet of the array of magnets is characterized by a magnetic field of a particular direction and wherein the magnetic fields of the magnets in the array magnets are selected and arranged to augment the magnetic field produced on the coil side of the magnet assembly and to reduce the magnetic field produced on the opposite side of the magnet assembly.

16. The electromagnetic actuator of claim 1, wherein the first port, the hollow inner region of the core, the outer coolant flow channel, and the second port, in that order, form a coolant flow path from one end of the actuator to an opposite end of the actuator and back.

17. The electromagnetic actuator of claim 16, wherein the first port is an inlet port and the second port is an outlet port.

18. The electromagnetic actuator of claim 1, further comprising a plurality of drive circuits located within the hollow region of the core and proximate to the coils.

19. The electromagnetic actuator of claim 18, wherein each drive circuit of the plurality of drive circuits is located within and arranged to drive a corresponding different coil of the array of coils.

20. The electromagnetic actuator of claim 19, wherein the core comprises two longitudinal segments made of an electrically conductive material, and wherein the two segments function as power buses for the plurality of drive circuits.

* * * * *